June 12, 1928.
A. T. HURTER
1,673,512
OPTICAL PROJECTION APPARATUS FOR ADVERTISEMENT PURPOSES
Filed June 23, 1927
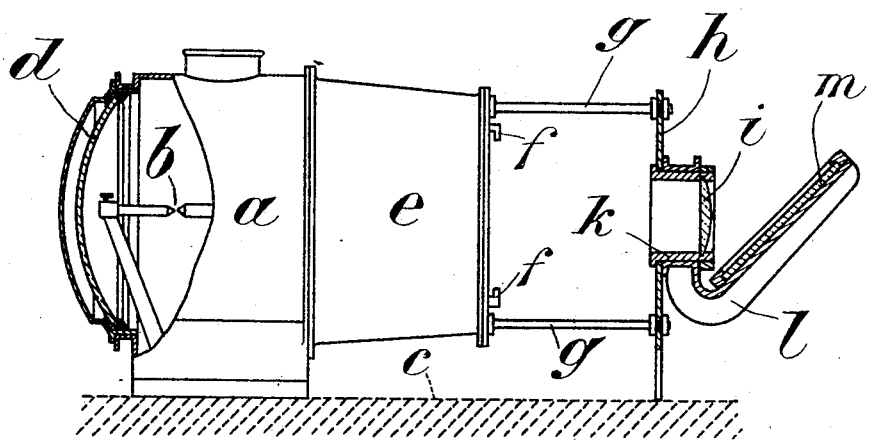
Inventor
Alfred Theodor Hurter
By B. Singer, Atty.

Patented June 12, 1928.

1,673,512

UNITED STATES PATENT OFFICE.

ALFRED THEODOR HURTER, OF LONDON, ENGLAND.

OPTICAL PROJECTION APPARATUS FOR ADVERTISEMENT PURPOSES.

Application filed June 23, 1927, Serial No. 200,924, and in Great Britain May 28, 1926.

This invention relates to advertising.

It has been suggested that the projection of advertising matter on to the clouds would produce very effective results. For this purpose it has hitherto been proposed to dispose the entire projection device movable and, while using it, to adjust it in such a way that the extension of the axis of the imaging pencil of rays directly strikes the clouds to be used as a projection screen. As for the purpose in question it is necessary to always use large and cumbersome devices, this kind of arrangement generally leads to comparatively difficult constructions. According to the present invention the device is constructed with a mirror, adjacent the projection objective and inclined at an angle of about 45°, which mirror reflects the imaging rays in the direction of the clouds serving as a projection screen. This admits of supporting the device in the most simple way.

The annexed drawing illustrates diagrammatically an example of the invention the drawing being a diagrammatic elevation partly in a section.

Referring to this drawing the apparatus consists of an arc lamp $b$, located in a casing $a$ and adapted to be mounted on a horizontal base $c$, behind which lamp is disposed a concave mirror $d$. To the arc lamp-casing $a$ is connected a light-guard $e$, which is provided with guides $f$ for the image to be projected and carries a plate $h$, fixed by means of bolts $g$ and supported on the base $c$. In the plate $h$ is supported a projection objective $i$ with a cylindrical sleeve $k$. On the latter is fitted a holder $l$, carrying a plane mirror $m$ which is inclined at an angle of about 45° to the optical axis of the projection objective $i$.

The adjustment of the arc lamp $b$ relatively to the concave mirror $d$ and the focal length of this mirror $d$ must be so chosen that the lamp-crater is imaged approximately in the objective $i$. The latter projects on to the clouds by means of the mirror $m$ the image of an object, inserted into the guides $f$.

What I claim and desire to secure by Letters Patent is:—

Apparatus for projecting images on to the clouds comprising in combination, a horizontally fixed casing mounted upon a supporting base, an arc lamp mounted at the rear end of said casing, a concave reflector situated behind said arc lamp, a conical light guard in alignment with and forming a continuation of said casing, guides mounted at the forward end of the light guard for accommodating a transparency slide, a front plate, bolts for rigidly connecting said plate with said light guard, a cylindrical sleeve mounted on said front plate, a projection objective lens carried in said cylindrical sleeve, a mirror disposed at an angle in front of said objective lens, a frame attached to said sleeve carrying the objective lens, said mirror being carried by said frame.

In witness whereof I affix my signature.

ALFRED THEODOR HURTER.